US012781828B2

(12) United States Patent
Kim et al.

(10) Patent No.: US 12,781,828 B2
(45) Date of Patent: Nov. 3, 2026

(54) PISTON VALVE ASSEMBLY AND FREQUENCY SENSITIVE SHOCK ABSORBER WITH THE SAME

(71) Applicant: HL Mando Corporation, Pyeongtaek-si (KR)

(72) Inventors: Kyudo Kim, Seoul (KR); Kwangduk Baek, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 537 days.

(21) Appl. No.: 18/220,884

(22) Filed: Jul. 12, 2023

(65) Prior Publication Data

US 2024/0019012 A1 Jan. 18, 2024

(30) Foreign Application Priority Data

Jul. 12, 2022 (KR) ........................ 10-2022-0085620
Mar. 15, 2023 (KR) ........................ 10-2023-0033676

(51) Int. Cl.
*F16F 9/512* (2006.01)
*F16F 9/348* (2006.01)
*F16K 31/363* (2006.01)

(52) U.S. Cl.
CPC ............ *F16F 9/5126* (2013.01); *F16F 9/348* (2013.01); *F16K 31/363* (2013.01); (Continued)

(58) Field of Classification Search
CPC .... F16F 9/34; F16F 9/064; F16F 9/512; F16F 9/5126; F16F 9/466; F16F 9/3405; (Continued)

(56) References Cited

U.S. PATENT DOCUMENTS 5,207,300 A * 5/1993 Engel ..................... B60G 17/08 188/266.2
5,248,014 A * 9/1993 Ashiba ...................... F16F 9/50 188/282.8

(Continued)

FOREIGN PATENT DOCUMENTS

DE 112016004157 T5 * 6/2018 .............. F16F 9/185
EP 1600662 A1 * 11/2005 ............ F16F 9/3485

(Continued)

OTHER PUBLICATIONS

Office Action dated May 13, 2026, for the corresponding Korean Patent Application No. 10-2023-0033676, along with an English machine translation (Total 16 pages).

*Primary Examiner* — Nicholas J Lane
*Assistant Examiner* — Mahbubur Rashid
(74) *Attorney, Agent, or Firm* — Hauptman Ham, LLP

(57) ABSTRACT

A piston valve assembly of a frequency sensitive shock absorber includes a piston valve main body mounted on the piston rod and having a piston inlet flow path formed therein in communication with a rebound chamber, a piston main retainer having a piston main chamber formed therein in communication with the piston inlet flow path, a piston main valve configured to open and close the piston main chamber, a piston pilot housing coupled to the piston rod between the piston main valve and the piston valve main body and having a piston pilot chamber formed therein in communication with the piston inlet flow path, and a pilot valve configured to cover the piston pilot chamber and press the piston main valve to close the piston main chamber when pressure in the piston pilot chamber increases above a predetermined pressure.

18 Claims, 11 Drawing Sheets

(52) U.S. Cl.
CPC ....... *F16F 2222/12* (2013.01); *F16F 2228/04* (2013.01); *F16F 2228/066* (2013.01)

(58) Field of Classification Search
CPC .......... F16F 13/007; F16F 9/3228; F16F 9/50; F16F 9/516; F16F 9/348; F16F 2228/04; F16F 2222/12; F16F 9/3221; F16F 9/3482; F16F 2228/066; F16K 31/363
See application file for complete search history.

(56) References Cited

U.S. PATENT DOCUMENTS

| | | | | |
|---|---|---|---|---|
| 5,690,195 A * | 11/1997 | Kruckemeyer | F16F 9/368 188/282.5 |
| 5,934,421 A * | 8/1999 | Nakadate | F16F 9/325 188/299.1 |
| 6,371,262 B1 * | 4/2002 | Katou | F16F 9/465 188/266.5 |
| 9,597,941 B2 * | 3/2017 | Yamashita | B60G 13/08 |
| 2015/0210136 A1 * | 7/2015 | Teraoka | F16F 9/3487 188/282.1 |
| 2020/0370616 A1 * | 11/2020 | Kim | F16F 9/3487 |
| 2020/0393015 A1 * | 12/2020 | Kim | F16F 9/3482 |

FOREIGN PATENT DOCUMENTS

| | | | | |
|---|---|---|---|---|
| JP | 2014-70643 A | 4/2014 | |
| JP | 2021050802 A * | 4/2021 | |
| KR | 101671967 B1 * | 11/2016 | F16F 9/512 |
| KR | 10-2020-0142293 A | 12/2020 | |
| KR | 102349894 B1 * | 1/2022 | F16F 9/3484 |

* cited by examiner

PISTON VALVE ASSEMBLY AND FREQUENCY SENSITIVE SHOCK ABSORBER WITH THE SAME

CROSS-REFERENCE TO RELATED APPLICATIONS

This application claims is based on, and claims priority from Korean Patent Application No. 10-2022-0085620, filed on Jul. 12, 2022 and Korean Patent Application No. 10-2023-0033676, filed on Mar. 15, 2023, the disclosure of which is hereby incorporated by reference herein in its entirety.

TECHNICAL FIELD

The present disclosure relates to a piston valve assembly and a shock absorber having the same, and more particularly to a frequency sensitive shock absorber capable of controlling a damping force different for high and low frequencies during a compression process or an extension process of a piston valve.

BACKGROUND

In general, vehicles are equipped with shock alleviating devices to alleviate the shock or vibration that the axle receives from the road surface when traveling to improve ride quality, and a shock absorber is used as one of these shock alleviating devices.

The shock absorber is also called a damper and is operated by the vibration of the vehicle in response to road conditions. In this case, a damping force generated by the shock absorber varies depending on an operating speed of the shock absorber, i.e., fast or slow operation.

The inventor(s) has noted that it is very important to control the damping force characteristics of the shock absorber when designing a vehicle, as ride quality and driving stability of the vehicle are controlled depending on how the damping force characteristics generated by the shock absorber are controlled.

For example, the shock absorber includes a cylinder filled with a working fluid such as oil, a piston rod connected adjacent to a vehicle body and reciprocating, and a piston valve coupled to a bottom end of the piston rod to slide within the cylinder and control the flow of the working fluid.

Meanwhile, the inventor(s) has experienced that the piston valve commonly used in the shock absorber is designed to have constant damping characteristics at high, medium, and low speeds using a single flow path. Therefore, in case of lowering the damping force at low speeds to improve ride quality, which also affects the damping force at medium and high speeds.

The inventor(s) has experienced that the shock absorber has a structure in which the damping force changes as the speed of the piston changes, regardless of frequency or stroke. As described above, the damping force that changes only in response to changes in the speed of the piston generates the same damping force in various road conditions. the inventor(s) has experienced that there is a problem that it is difficult to satisfy ride quality and stability of adjustment at the same time.

SUMMARY

In accordance with some embodiments of the present disclosure, a piston valve assembly and a frequency sensitive shock absorber is capable of generating a damping force that varies with frequency and speed changes.

In accordance with some embodiments of the present disclosure, a piston valve assembly is configured to generate a damping force that varies with a magnitude of a frequency during an extension process of a frequency sensitive shock absorber. The piston valve assembly includes: a piston valve main body configured to adjust movement of working fluid between the compression chamber and the rebound chamber, and mounted on a piston rod that is configured to divide a cylinder of the frequency sensitive shock absorber into a compression chamber and a rebound chamber and has a piston inlet flow path formed therein in communication with the rebound chamber; a piston main retainer coupled to the piston rod and having a piston main chamber formed therein in communication with the piston inlet flow path; a piston main valve coupled to the piston rod to open and close the piston main chamber; a piston pilot housing coupled to the piston rod between the piston main valve and the piston valve main body and having a piston pilot chamber formed therein in communication with the piston inlet flow path; and a pilot valve coupled to the piston rod to cover the piston pilot chamber and configured to press the piston main valve to close the piston main chamber when pressure in the piston pilot chamber increases above a predetermined pressure.

The piston valve assembly further includes a piston inlet disk interposed between the piston pilot housing and the pilot valve. Further, the piston pilot chamber is configured to communicate with the piston inlet flow path via the piston inlet disk so that an inflow flow rate of working fluid introduced into the piston pilot chamber during the extension process is relatively limited compared to an inflow flow rate of working fluid introduced into the piston main chamber, selectively depending on the frequency.

The piston inlet disk includes at least one slit formed to communicate the piston inlet flow path formed in the piston rod with the piston pilot chamber to allow working fluid to be introduced into the piston pilot chamber.

The pilot valve is configured to press the piston main valve by pressure of working fluid introduced into the piston pilot chamber and allow the piston main valve to close the piston main chamber during a low frequency extension process, and in which the pilot valve is configured to allow the piston main valve to be opened by pressure in the piston main chamber when a force to press the piston main valve is weakened as pressure of working fluid introduced into the piston pilot chamber becomes relatively lower than pressure of working fluid introduced into the piston main chamber during a high frequency extension process.

An inflow flow rate of working fluid introduced into the piston pilot chamber increases and pressure of the piston pilot chamber increases as a stroke of the piston rod is operated in a relatively greater range during a low frequency extension process than during a high frequency extension process, and in which the pilot valve presses the piston main valve to close the piston main chamber when pressure in the piston pilot chamber increases above a predetermined pressure.

An inflow flow rate of working fluid introduced into the piston pilot chamber decreases and pressure of the piston pilot chamber decreases as a stroke of the piston rod is operated with a relatively smaller range during a high frequency extension process than during a low frequency extension process, and in which a force with which the pilot valve presses the piston main valve is weakened to allow the piston main valve to be opened by pressure in the piston main chamber when pressure in the piston pilot chamber decreases below a predetermined pressure.

The piston inlet flow path is formed in the form of a slit on an outer peripheral surface of one side of the piston rod along a longitudinal direction of the piston rod.

The piston valve main body includes a plurality of piston compression flow paths and a plurality of piston extension flow paths that are penetratively formed therein in a direction connecting the compression chamber and the rebound chamber.

An area of one surface of the piston main retainer facing the piston pilot housing is opened to form the piston main chamber, in which an inlet hole connected to the piston inlet flow path is formed on the other surface opposite one surface of the piston main retainer, and in which the inlet hole formed on the other surface of the piston main retainer is connected to the piston main chamber formed on one surface of the piston main retainer.

The piston valve assembly further includes: a piston nut fastened to an end of the piston rod that penetrates the piston valve main body, the piston pilot housing, and the piston main retainer in turn; and a piston washer provided between the piston nut and the other surface of the piston main retainer.

Another exemplary embodiment of the present disclosure provides a frequency sensitive shock absorber, the frequency sensitive shock absorber including: a piston rod configured to reciprocatingly move inside a cylinder and having a piston inlet flow path formed therein in communication with a rebound chamber; and a piston valve assembly mounted on the piston rod and configured to divide the cylinder into a compression chamber and a rebound chamber and to generate a damping force that varies with magnitude of frequency during an extension process. Further, the piston valve assembly includes: a piston valve main body mounted on the piston rod to adjust movement of working fluid between the compression chamber and the rebound chamber; a piston main retainer coupled to the piston rod and having a piston main chamber formed therein in communication with the piston inlet flow path; a piston main valve coupled to the piston rod to open and close the piston main chamber; a piston pilot housing coupled to the piston rod between the piston main valve and the piston valve main body and having a piston pilot chamber formed therein in communication with the piston inlet flow path; and a pilot valve coupled to the piston rod to cover the piston pilot chamber and configured to press the piston main valve to close the piston main chamber when pressure in the piston pilot chamber increases above a predetermined pressure.

The piston valve assembly further includes a piston inlet disk interposed between the piston pilot housing and the pilot valve. Further, the piston pilot chamber is configured to communicate with the piston inlet flow path via the piston inlet disk so that an inflow flow rate of working fluid introduced into the piston pilot chamber during the extension process is relatively limited compared to an inflow flow rate of working fluid introduced into the piston main chamber, selectively depending on the frequency.

The piston inlet disk includes at least one slit formed to communicate the piston inlet flow path formed in the piston rod with the piston pilot chamber to allow working fluid to be introduced into the piston pilot chamber.

The pilot valve is configured to press the piston main valve by pressure of working fluid introduced into the piston pilot chamber and allow the piston main valve to close the piston main chamber during a low frequency extension process, and in which the pilot valve is configured to allow the piston main valve to be opened by pressure in the piston main chamber when a force to press the piston main valve is weakened as pressure of working fluid introduced into the piston pilot chamber becomes relatively lower than pressure of working fluid introduced into the piston main chamber during a high frequency extension process.

An inflow flow rate of working fluid introduced into the piston pilot chamber increases and pressure of the piston pilot chamber increases as a stroke of the piston rod is operated in a relatively greater range during a low frequency extension process than during a high frequency extension process, and in which the pilot valve presses the piston main valve to close the piston main chamber when pressure in the piston pilot chamber increases above a predetermined pressure.

An inflow flow rate of working fluid introduced into the piston pilot chamber decreases and pressure of the piston pilot chamber decreases as a stroke of the piston rod is operated with a relatively smaller range during a high frequency extension process than during a low frequency extension process, and in which a force with which the pilot valve presses the piston main valve is weakened to allow the piston main valve to be opened by pressure in the piston main chamber when pressure in the piston pilot chamber decreases below a predetermined pressure.

The piston inlet flow path is formed in the form of a slit on an outer peripheral surface of one side of the piston rod along a longitudinal direction of the piston rod.

The piston valve main body includes a plurality of piston compression flow paths and a plurality of piston extension flow paths that are penetratively formed therein in a direction connecting the compression chamber and the rebound chamber.

An area of one surface of the piston main retainer facing the piston pilot housing is opened to form the piston main chamber, in which an inlet hole connected to the piston inlet flow path is formed on the other surface opposite one surface of the piston main retainer, and in which the inlet hole formed on the other surface of the piston main retainer is connected to the piston main chamber formed on one surface of the piston main retainer.

The piston valve assembly further includes: a piston nut fastened to an end of the piston rod that penetrates the piston valve main body, the piston pilot housing, and the piston main retainer in turn; and a piston washer provided between the piston nut and the other surface of the piston main retainer.

According to the exemplary embodiments of the present disclosure, the piston valve assembly and the frequency sensitive shock absorber effectively generates a damping force that varies with changes in frequency and speed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
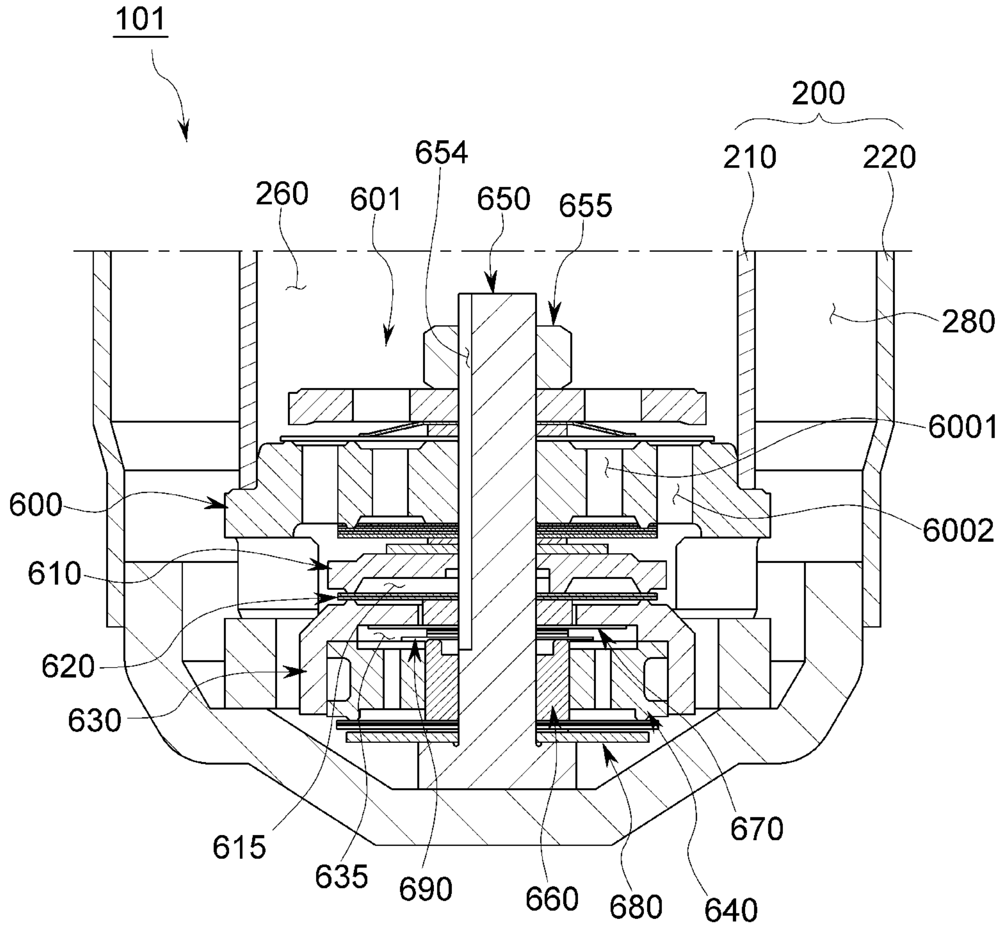
FIG. 1 is a cross-sectional view illustrating a body valve assembly and a frequency sensitive shock absorber having the same, according to at least first embodiment of the present disclosure.

In the following detailed description, reference is made to the accompanying drawing, which forms a part hereof. The illustrative embodiments described in the detailed description, drawing, and claims are not meant to be limiting. Other embodiments may be utilized, and other changes may be made, without departing from the spirit or scope of the subject matter presented here.

Hereinafter, at least one embodiments of the present disclosure will be described in detail with reference to the accompanying drawings so that those with ordinary skill in the art to which the present disclosure pertains may easily carry out the embodiments. The at least one embodiments of the present disclosure may be implemented in various different ways, and is not limited to the embodiments described herein.

The constituent elements having the same configurations in the several embodiments will be assigned with the same reference numerals and described representatively in a first embodiment, and only the constituent elements, which are different from the constituent elements according to the first embodiment, will be described in other embodiments.

It is noted that the drawings are schematic, and are not illustrated based on actual scales. Relative dimensions and proportions of parts illustrated in the drawings are exaggerated or reduced in size for the purpose of clarity and convenience in the drawings, and any dimension is just illustrative but not restrictive. The same reference numerals designate the same structures, elements or components illustrated in two or more drawings in order to exhibit similar characteristics.

At least one embodiment of the present disclosure illustrate ideal embodiments of the present disclosure in detail. As a result, various modifications of the drawings are expected. Therefore, the embodiments are not limited to specific forms in regions illustrated in the drawings, and for example, include modifications of forms by the manufacture thereof.

Unless otherwise defined, all technical and scientific terms used in the present specification have meanings generally understood by those skilled in the art to which the present disclosure pertains. All terms used in the present specification are selected for the purpose of more clearly explaining the present disclosure but not selected to restrict the scope of the present disclosure.

The expressions "include," "provided with," "have" and the like used in the present specification should be understood as open-ended terms connoting the possibility of inclusion of other embodiments unless otherwise mentioned in a phrase or sentence including the expressions.

A singular expression can include the meanings of the plurality unless otherwise mentioned, and the same applies to a singular expression stated in the claims.

The terms "first," "second," and the like used in the present specification are used to identify a plurality of constituent elements from one another and are not intended to limit the order or importance of the relevant constituent elements.

Hereinafter, with reference to FIGS. 1 to 5, a body valve assembly 601 and a frequency sensitive shock absorber 101 having the same will be described according to a first embodiment of the present disclosure. Here, a shock absorber is called a damper. For example, the shock absorber is installed in a vehicle and used to absorb and attenuate impact or vibration applied to an axle from a road surface while a vehicle travels. As illustrated in FIG. 1, the frequency sensitive shock absorber 101 includes a cylinder 200 and the body valve assembly 601 according to the first embodiment of the present disclosure.

Although not illustrated in FIG. 1, and with reference to FIG. 6, which will be described below, the frequency sensitive shock absorber 101 further includes a piston rod 350, a piston valve main body 300.

The cylinder 200 has a cylindrical shape that forms a space therein, and a working fluid is filled inside the cylinder 200. Further, the cylinder 200 includes a first cylinder 210 and a second cylinder 220.

The piston valve main body 300 to be described below is disposed in the first cylinder 210 and configured to be movable upward and downward. An interior of the first cylinder 210 is divided into a compression chamber and a rebound chamber by the piston valve main body 300. For example, based on the piston valve main body 300, the rebound chamber 270 is disposed at an upper side of the first cylinder 210, and the compression chamber 260 is disposed at a lower side of the first cylinder 210.

The second cylinder 220 surrounds the first cylinder 210 with a separation space interposed therebetween, such that a reserve chamber 280 is defined between the second cylinder 220 and the first cylinder 210.

The piston rod 350 is reciprocally movable inside the first cylinder 210. Further, the piston valve main body 300, which will be described below, is mounted on one side of the piston rod 350.

The piston valve main body 300 divides the interior of the first cylinder 210 into the compression chamber 260 and the rebound chamber 270.

The body valve assembly 601 is installed at an end of the first cylinder 210 adjacent to the compression chamber 260 to adjust a movement of working fluid between the compression chamber 260 and the reserve chamber 280. In particular, in the first embodiment of the present disclosure, the body valve assembly 601 generates a damping force that varies with magnitude of frequency during a compression process.

Specifically, the body valve assembly 601 includes a body valve main body 600, a body pin 650, a body main retainer 610, a body main valve 620, a body pilot housing 630, and a free piston 640.

The body valve assembly 601 further includes a body inlet disc 690, and further includes one or more of a body nut 655, a disc spring 670, a body spacer 660, and a body washer 680.

The body valve main body 600 is installed at an end adjacent to the compression chamber 260 to adjust a movement of working fluid between the compression chamber 260 and the reserve chamber 280. That is, the body valve main body 600 includes a plurality of body compression flow paths 6001 and a plurality of body extension flow paths 6002 that are penetratively formed therein in a direction connecting the compression chamber 260 and the reserve chamber 280 to allow fluid to move between the compression chamber 260 and the reserve chamber 280.

Accordingly, during the compression process, fluid inside the compression chamber 260 moves through the piston valve main body 300 to the rebound chamber 270 or through the body valve main body 600 to the reserve chamber 280, thereby generating a damping force against impact or vibration.

The body pin 650 penetrates and is fastened to the body valve main body 600, and a body inlet flow path 654 is formed in communication with the compression chamber 260. Here, the body inlet flow path 654 is elongated in the form of a slit in the longitudinal direction of the body pin 650 on an outer peripheral surface of one side of the body pin 650.

The body main retainer 610 is coupled to the body pin 650. For example, the body main retainer 610 is coupled to the body pin 650 to be disposed adjacent to the other surface that is opposite to one surface of the body valve main body 600 facing with the compression chamber 260. Further, the body main retainer 610 has a body main chamber 615 formed to communicate with the body inlet flow path 654 formed in the body pin 650.

Specifically, one side of the body main retainer 610 faces the body valve main body 600, and the other side of the body main retainer 610 has a body main chamber 615 formed. That is, a portion of the other side of the body main retainer 610 facing the body pilot housing 630, which will be described below, is opened. A body main chamber 615 is formed in the opened portion.

The body main valve 620 is coupled to the body pin 650 to open and close the body main chamber 615. That is, the body main valve 620 contacts or fall off the other side of the body main retainer 610 to open and close the body main chamber 615.

The body pilot housing 630 is coupled to the body pin 650. One side of the body pilot housing 630 faces the body main valve 620 and a body pilot chamber 635 is formed on the other side thereof in communication with the body inlet flow path 654. That is, a portion of the other side of the body pilot housing 630 facing the free piston 640, which will be described below, is opened. A body pilot chamber 635 is formed in the opened portion. Further, one side of the body pilot housing 630 facing the body main valve 620 presses the body main valve 620 to close the body main chamber 615 in response to an operation of the free piston 640, which will be described later.

A body inlet disc 690 is interposed between the body pilot housing 630 and the free piston 640 to communicate the body pilot chamber 635 with the body inlet flow path 654.

Figure 2:
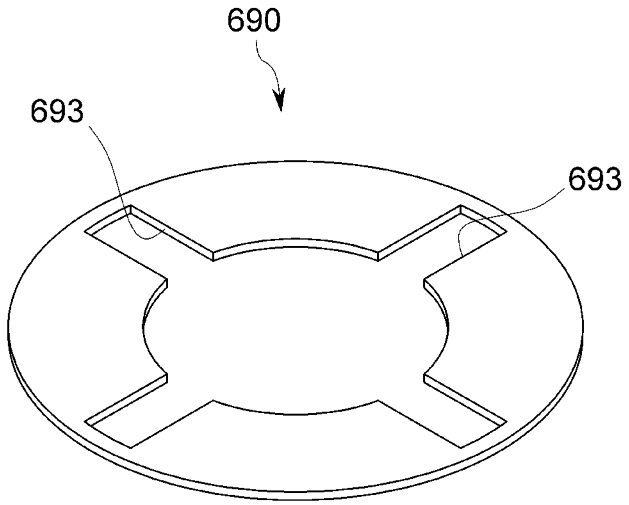
FIG. 2 is a perspective view illustrating a body inlet disk used in the body valve assembly of FIG. 1.

Specifically, as illustrated in FIG. 2, the body inlet disk 690 includes at least one body inlet disk slit 693 formed to communicate the body inlet flow path 654 formed in the body pin 650 with the body pilot chamber 635 to allow working fluid to enter the body pilot chamber 635. The body inlet disk slit 693 is formed from a hollow portion of the body inlet disk 690 that the body pin 650 penetrates to a position that communicates with the body pilot chamber 635. Accordingly, the body inlet flow path 654 and the body pilot chamber 635 are communicated through the body inlet disk slit 693. Further, the flow rate of working fluid entering the body pilot chamber 635 is adjusted by adjusting the number and size of the body inlet disk slits 693.

As described above, because the body pilot chamber 635 is communicated with the body inlet flow path 654 via the body inlet disk 690, an inflow flow rate of working fluid entering the body pilot chamber 635 during the compression process is relatively more limited than an inflow flow rate of working fluid entering the body main chamber 615, depending on frequency.

For example, as pressure of working fluid entering the body inlet flow path 654 increases, working fluid entering the body pilot chamber 635 will have a lower flow rate than working fluid entering the body main chamber 615.

The free piston 640 is coupled to the body pin 650 and is accommodated in the body pilot chamber 635. The free piston 640 is configured to press the body pilot housing 630 in a direction toward the body main valve 620 when the pressure in the body pilot chamber 635 increases above a predetermined pressure. Here, the predetermined pressure is configured to vary depending on the performance required for the frequency sensitive shock absorber 101, and pressure that balances pressure in the body main chamber 615 with pressure in the body pilot chamber 635. Further, the predetermined pressure is adjusted by the size of at least one body inlet disk slit 693 formed in the body inlet disk 690 and a disk spring 670, which will be discussed below.

Specifically, the free piston 640 is configured to press the body pilot housing 630 in a direction toward the body main valve 620 by pressure of working fluid entering the body pilot chamber 635 during a low frequency compression process, such that the body main valve 620 closes the body main chamber 615. Further, during a high frequency compression process, as pressure of working fluid entering the body pilot chamber 635 becomes relatively lower than pressure of working fluid entering the body main chamber 615, a force for the free piston 640 to press the body pilot housing 630 in a direction toward the body main valve 620 decreases, and the body main valve 620 is opened by pressure in the body main chamber 615.

Here, during the high frequency compression process, the pressure of working fluid entering the body pilot chamber 635 is relatively lower than the pressure of working fluid entering the body main chamber 615 because an inflow flow rate of working fluid entering the body pilot chamber 635 is limited as the working fluid enters through the body inlet disk 690.

For example, during a low frequency compression process, the flow rate of working fluid entering the body pilot chamber 635 through the body inlet disk 690 is sufficient to facilitate pressure formation in the body pilot chamber 635, such that when pressure between the body pilot chamber 635 and the body main chamber 615 is equilibrated, the body main valve 620 is not opened. However, during the high frequency compression process, the flow rate of working fluid entering the body pilot chamber 635 is limited by the body inlet disk 690, causing pressure in the body pilot chamber 635 to be lower than pressure in the body main chamber 615. Therefore, a force of the free piston 640 pressing the body pilot housing 630 in a direction toward the body main valve 620 decreases, causing the body main valve 620 to be opened by pressure in the body main chamber 615, thereby allowing working fluid in the compression chamber 260 to move through the body inlet flow path 654 and the body main chamber 615 to the reserve chamber 280.

That is, during the low frequency compression process, working fluid in the compression chamber 260 moves to the reserve chamber 280 through the body valve main body 600. In contrast, during the high frequency compression process, working fluid in the compression chamber 260 moves to the reserve chamber 280 through the body valve main body 600, the body inlet flow path 654, and the body main chamber 615. Therefore, the frequency sensitive shock absorber 101 becomes capable of varying a damping force generated in response to a change in frequency.

The disk spring 670 elastically presses the body pilot housing 630 in a direction toward the body main valve 620. That is, with no pressure applied to the body pilot chamber 635, the body pilot housing 630 is in contact with the body main valve 620 by the disk spring 670, and the body main valve 620 is in contact with the body main retainer 610 to keep the body main chamber 615 closed. The disk spring 670 is used to adjust the damping force of the frequency sensitive shock absorber 101, which will also affect pressure equilibrium between the body main chamber 615 and the body pilot chamber 635.

The body washer 680 is mounted to the body pin 650 in the other direction opposite to one direction in which the free piston 640 faces the body pilot housing 630.

The body spacer 660 is mounted to the body pin 650 to maintain a minimum spacing between the body washer 680 and the body pilot housing 630.

The body nut 655 is coupled to one end of the body pin 650, which penetrates the body valve main body 600 and protrudes therefrom. That is, the body nut 655 prevents the body valve main body 600, as well as the body main retainer 610, the body pilot housing 630, and the free piston 640, from being separated from the body pin 650.

With this configuration, the body valve assembly 601 according to the first embodiment of the present disclosure and the frequency sensitive shock absorber 101 having the same effectively generates a damping force that varies with changes in frequency and speed.

Specifically, by adjusting the inflow flow rate of working fluid that passes through the body inlet flow path 654 and enters the body pilot chamber 635 and the body main chamber 615 during the compression process, a similar damping force is implemented at low and high frequencies in a low speed section, and the damping force is variable according to low and high frequencies in medium and high speed sections, thereby simultaneously satisfying ride quality and stability in adjustment of the vehicle.

Hereinafter, with reference to FIGS. 3 and 4, an operational state of the body valve assembly 601 and the frequency sensitive shock absorber 101 having the same will be described in detail according to the first embodiment of the present disclosure.

Figure 3:
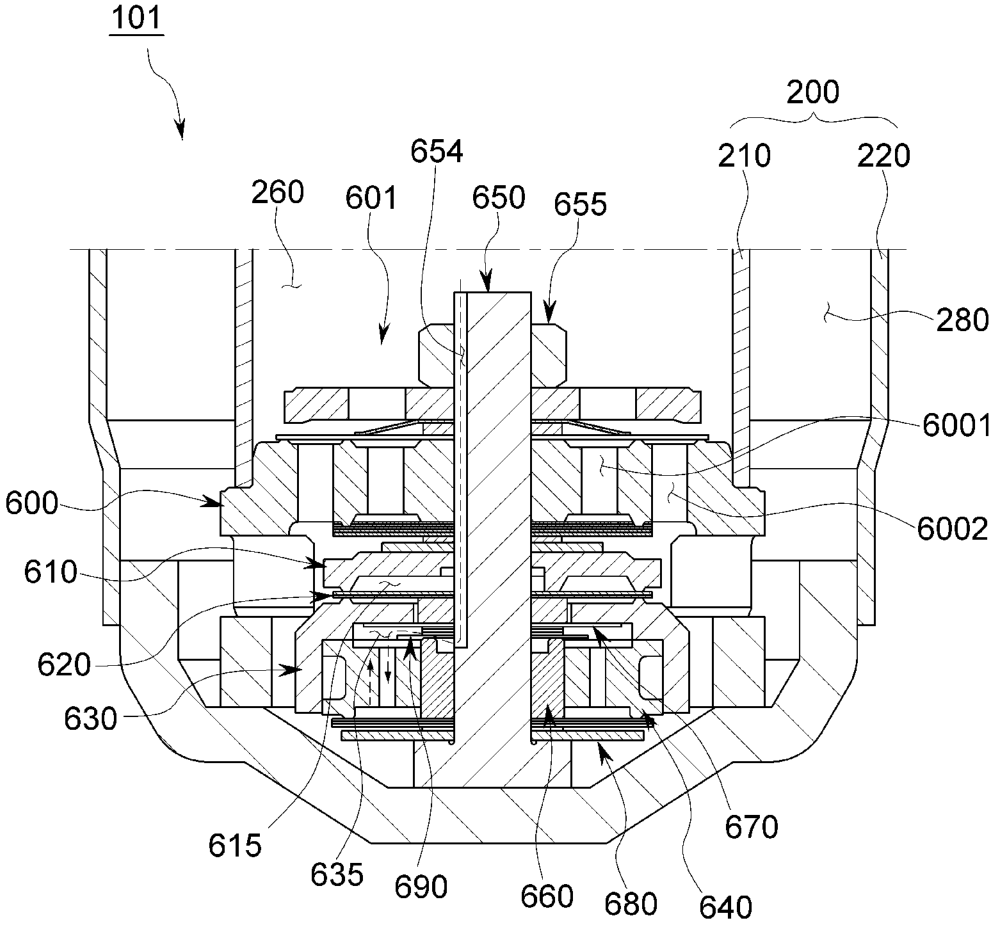
FIGS. 3 and 4 are cross-sectional views illustrating an operational state of the frequency sensitive shock absorber of FIG. 1.

First, as illustrated in FIG. 3, during a low frequency compression process, a stroke of the piston rod 350 is operated to a relatively greater range than during a high frequency compression process. Accordingly, pressure in the body pilot chamber 635 increases as the inflow flow rate of working fluid entering the body pilot chamber 635 increases.

As described above, during the low frequency compression process, the flow rate of working fluid entering the body pilot chamber 635 through the body inlet disk 690 is sufficient to facilitate pressure formation in the body pilot chamber 635, such that pressure between the body pilot chamber 635 and the body main chamber 615 is equilibrated, thereby the body main valve 620 is not opened.

That is, when pressure in the body pilot chamber 635 increases above a predetermined pressure during the low frequency compression process, the free piston 640 presses the body pilot housing 630 in a direction toward the body main valve 620 by pressure of working fluid introduced into the body pilot chamber 635. Accordingly, the body pilot housing 630 pushes the body main valve 620 to close the body main chamber 615. Here, the predetermined pressure is configured to vary depending on the performance required for the frequency sensitive shock absorber 101, and pressure that balances pressure in the body main chamber 615 with pressure in the body pilot chamber 635. Further, the predetermined pressure is adjusted by the size of at least one body inlet disk slit 693 formed in the body inlet disk 690 and a disk spring 670.

Therefore, during the low frequency compression process, working fluid in the compression chamber 260 moves through the body valve main body 600 to the reserve chamber 280 and is not allowed to move through the body inlet flow path 654 and the body main chamber 615. Therefore, the frequency sensitive shock absorber 101 generates a relatively high damping force during the low frequency compression process.

Figure 4:
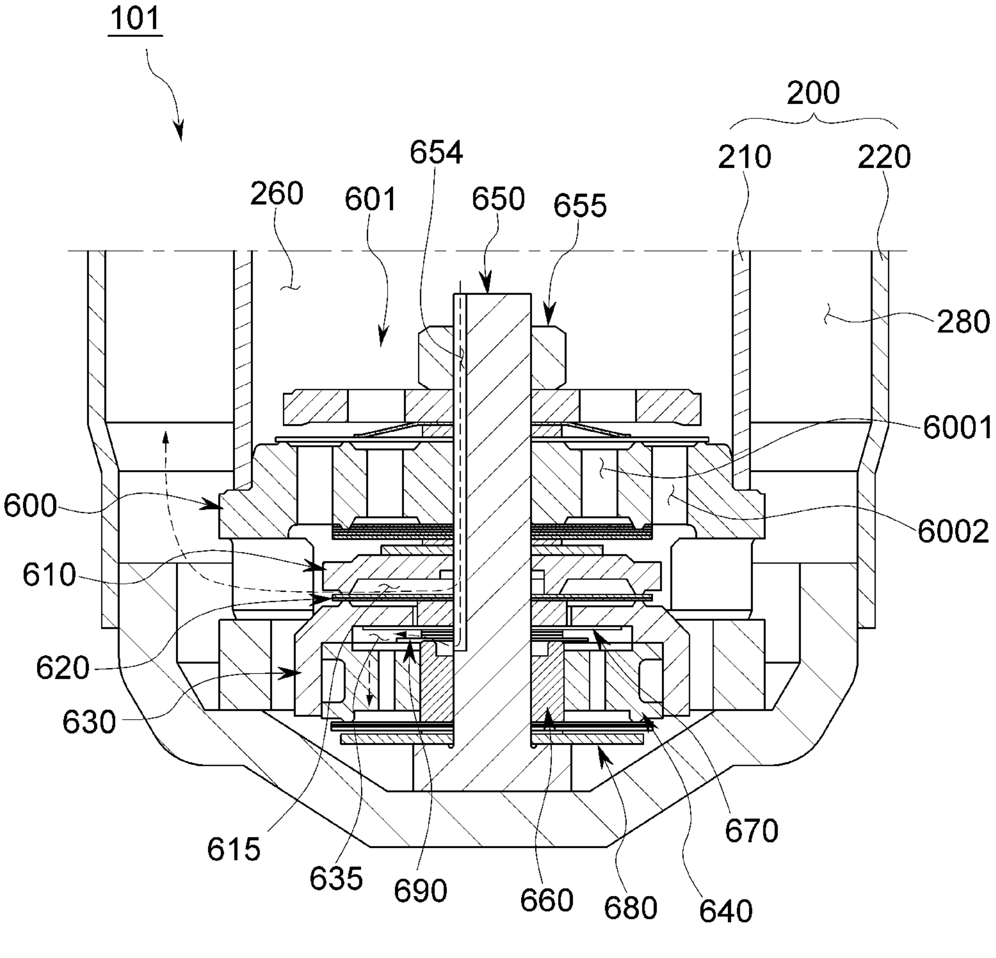

Next, as illustrated in FIG. 4, during the high frequency compression process, a stroke of the piston rod 350 is operated in a relatively smaller range than during the low frequency compression process. Accordingly, pressure in the body pilot chamber 635 decreases as the inflow flow rate of working fluid entering the body pilot chamber 635 decreases.

As described above, during the high frequency compression process, the inflow flow rate of working fluid entering the body pilot chamber 635 is limited by the body inlet disk 690, causing pressure in the body pilot chamber 635 to be lower than pressure in the body main chamber 615. Therefore, a force of the free piston 640 pressing the body pilot housing 630 in a direction toward the body main valve 620 decreases, causing the body main valve 620 to be opened by pressure in the body main chamber 615, thereby allowing working fluid in the compression chamber 260 to move through the body inlet flow path 654 and the body main chamber 615 to the reserve chamber 280 as well.

That is, when pressure in the body pilot chamber 635 decreases below a predetermined pressure during the high frequency compression process, a force with which the free piston 640 presses the body pilot housing 630 in a direction toward the body main valve 620 is weakened by pressure of working fluid introduced into the body pilot chamber 635. Accordingly, the body main valve 620 is operated to be opened by pressure in the body main chamber 615.

Therefore, during the high-frequency compression process, working fluid in the compression chamber 260 moves to the reserve chamber 280 not only through the body valve main body 600, but also through the body inlet flow path 654 and the body main chamber 615. That is, during the high frequency compression process, the body inlet flow path 654 and the body main chamber 415 form a bypass flow path through which working fluid moves from the compression chamber 260 to the reserve chamber 280.

Therefore, the frequency sensitive shock absorber 101 generates a relatively low damping force during the high frequency compression process.

Figure 5:
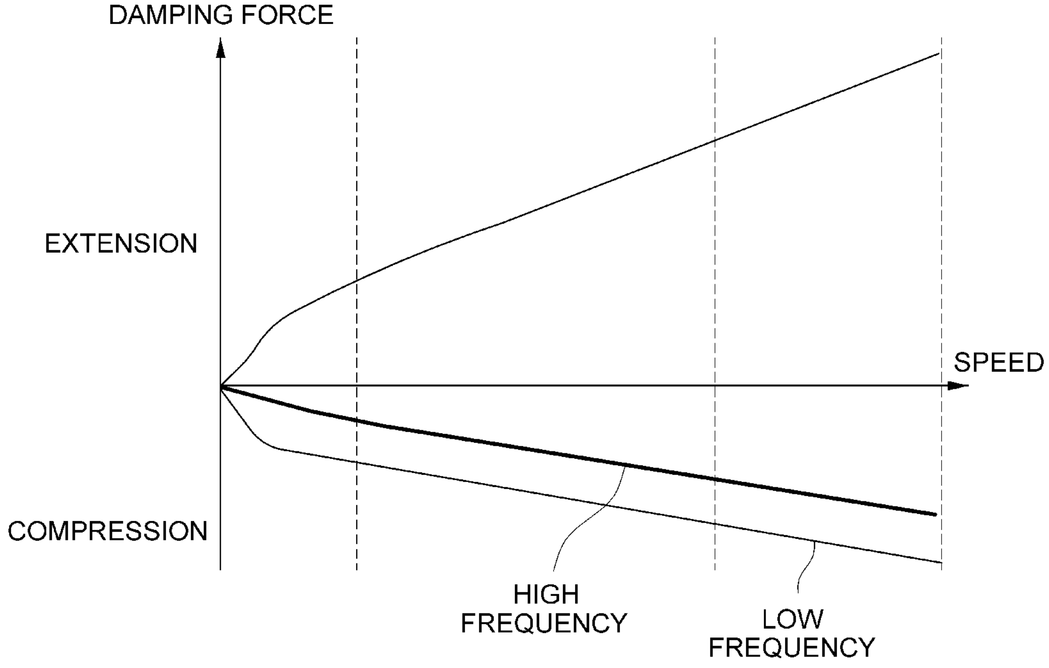
FIG. 5 is a graph illustrating an operational effect of the body valve assembly and the frequency sensitive shock absorber having the same, according to the first embodiment of the present disclosure.

FIG. 5 is a graph illustrating a damping force variation of the frequency sensitive shock absorber 101 during the low frequency compression process and the high frequency compression process. As illustrated in FIG. 5, the frequency sensitive shock absorber 101 prevents a damping force from decreasing during the low frequency compression process, and that the damping force varies by frequency in the high and medium speed sections.

As described above, the body valve assembly 601 and the frequency sensitive shock absorber 101 having the same, according to the first embodiment of the present disclosure, prevents degradation of stability of adjustment by preventing a damping force from decreasing in the low speed section during the low frequency compression process, and improves ride quality by generating a variable performance of the damping force by frequency in the medium speed section.

Hereinafter, with reference to FIGS. 6 to 10, a piston valve assembly 301 and a frequency sensitive shock absorber 102 having the same will be described according to a second embodiment of the present disclosure.

Figure 6:
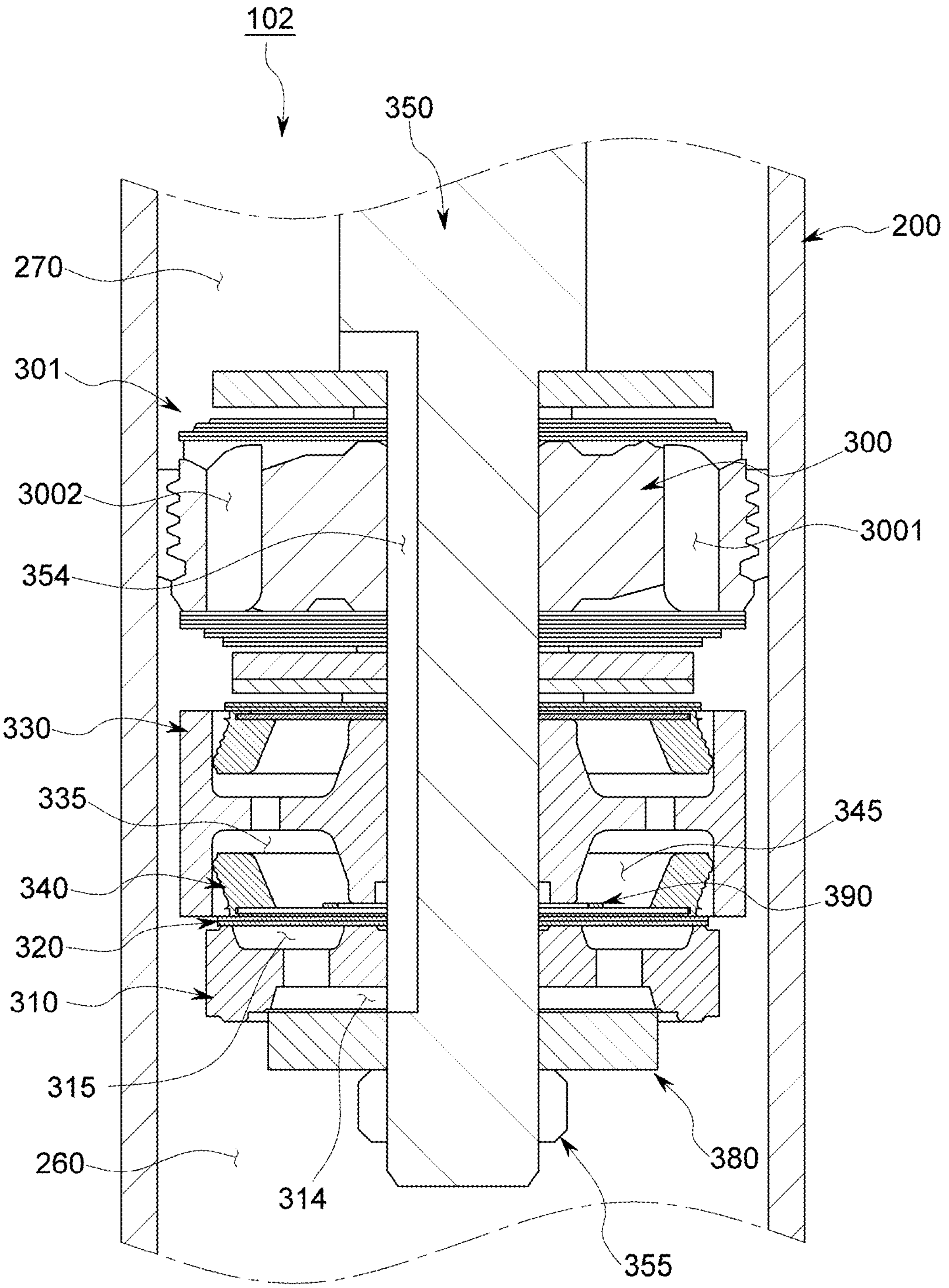
FIG. 6 is a cross-sectional view illustrating a piston valve assembly and a frequency sensitive shock absorber having the same, according to at least second embodiment of the present disclosure.

As illustrated in FIG. 6, the frequency sensitive shock absorber 101 includes a cylinder 200, a piston rod 350, and the piston valve assembly 301.

The cylinder 200 has a cylindrical shape that forms a space therein, and a working fluid is filled inside the cylinder 200. Here, the interior of the cylinder 200 is divided into the compression chamber 260 and the rebound chamber 270 by the piston valve assembly 301, which will be described below. For example, based on the piston valve assembly 301, the rebound chamber 270 is disposed at an upper side of the cylinder 200, and the compression chamber 260 is disposed at a lower side of the cylinder 200.

Meanwhile, the cylinder 200 in FIG. 6 is the first cylinder 210 of the first embodiment described above.

The piston rod 350 is reciprocally movable inside the cylinder 200. For example, one side of the piston rod 350 is positioned inside of the cylinder 200 and the other side of the piston rod 350 extends outside of the cylinder 200 to be connected adjacent to a body or wheel of the vehicle. Further, the piston valve assembly 301, which will be described below, is mounted on one side of the piston rod 350.

In addition, in the second embodiment of the present disclosure, a piston inlet flow path 354 is formed in the piston rod 350 that communicates with the rebound chamber 270. Here, the piston inlet flow path 354 is elongated in the form of a slit in the longitudinal direction of the piston rod 350 on an outer peripheral surface of one side of the piston rod 350.

The piston valve assembly 301 is mounted on the piston rod 350, divides the cylinder 200 into the compression chamber 260 and the rebound chamber 270, and adjusts movement of working fluid between the compression chamber 260 and the rebound chamber 270. In particular, in the second embodiment of the present disclosure, the piston valve assembly 301 generates a damping force that varies with magnitude of frequency during the extension process.

Specifically, the piston valve assembly 301 includes a piston valve main body 300, a piston main retainer 310, a piston main valve 320, a piston pilot housing 330, and a pilot valve 340.

The piston valve assembly 301 further includes a piston inlet disk 390, and further includes one or more of a piston nut 355 and a piston washer 380.

The piston valve body 300 is mounted on the piston rod 350 to adjust movement of working fluid between the compression chamber 260 and the rebound chamber 270. That is, the piston valve body 300 is provided to reciprocate inside the cylinder 200 filled with working fluid together with the piston rod 350 with the piston rod 350 penetratively coupled to the piston valve body 300. Further, the piston valve main body 300 includes a plurality of piston compression flow paths 3001 and a plurality of piston extension flow paths 3002 penetratively formed in a direction connecting the compression chamber 260 and the rebound chamber 270 to allow fluid to move between the compression chamber 260 and the rebound chamber 270.

For example, during the extension process, pressure in the rebound chamber 270 increases relatively higher than pressure in the compression chamber 260. Accordingly, working fluid filled in the rebound chamber 270 moves to the compression chamber 260 through the extension flow path 3002 of the piston valve body 300 by the increased pressure in the rebound chamber 270. In contrast, during the compression process, pressure in the compression chamber 260 increases relatively higher than pressure in the rebound chamber 270. Accordingly, working fluid filled in the compression chamber 260 moves to the rebound chamber 270 through the compression flow path 3001 of the piston valve body 300 by the increased pressure in the compression chamber 260.

In this case, the piston valve assembly 301 according to the second embodiment of the present disclosure is mounted on the piston rod 350 and generates a damping force that varies with magnitude of frequency during the extension process.

The piston main retainer 310 is coupled to the piston rod 350. For example, the piston main retainer 310 is coupled to the piston rod 350 with a piston pilot housing 330 interposed therebetween, which will be described below, in a direction in which the piston valve body 300 faces the compression chamber 260. That is, the piston pilot housing 330 and the piston main retainer 310 are coupled to the piston rod 350 in turn, in the direction in which the piston valve body 300 faces the compression chamber 260.

The piston main retainer 310 has a piston main chamber 315 formed to communicate with the piston inlet flow path 354 formed in the piston rod 350.

Specifically, an area of one surface of the piston main retainer 310 that faces the piston pilot housing 330 is opened, and the piston main chamber 315 is formed in the opened area. Further, on the other surface of the piston main retainer 310 that is opposite to the one surface thereof, an inlet hole 314 is formed, which is connected to the piston inlet flow path 354. The inlet hole 314 formed on the other surface of the piston main retainer 310 is connected with the piston main chamber 315 formed on one surface of the piston main retainer 310 through an internal flow path.

As described above, the piston main chamber 315 and the inlet hole 314 are formed on different and separate surfaces of the piston main retainer 310, and not be formed on the same surface, thereby improving mechanical strength of the piston main retainer 310.

Meanwhile, contrary to the second embodiment of the present disclosure, when both the piston main chamber 315 and the inlet hole 314 are formed on the same surface of the piston main retainer 310, mechanical strength of the surface on which the piston main chamber 315 and the inlet hole 314 are formed together is weakened. Accordingly, the main retainer 310 becomes weaker in ability to resist axial loads and is easily damaged.

When the piston rod 350 penetrates all of the piston valve body 300, the piston pilot housing 330, and the piston main retainer 310, and is then fastened by the piston nut 355, which will be described below, significant axial loads are be applied. In this case, when both the piston main chamber 315 and the inlet hole 314 are formed on the same surface of the piston main retainer 310, the piston main retainer 310 is not able to withstand this load and is damaged.

However, according to the second embodiment of the present disclosure, the piston main chamber 315 is formed on one surface of the piston main retainer 310 and the inlet hole 314 communicating with the piston inlet flow path 354 is formed on the other surface that is opposite to the one surface, so that the piston main chamber 315 and the inlet hole 314 are distributed to secure overall improved mechanical strength. Therefore, when all of the piston valve body 300, the piston pilot housing 330, and the piston main retainer 310 are penetrated by the piston rod 350 and then fastened by means of the piston nut 355, the piston main retainer 310 stably withstands axial loads.

The piston main valve 320 is coupled to the piston rod 350 to open and close the piston main chamber 315. That is, the piston main valve 320 contacts or falls off one surface of the piston main retainer 310 to open and close the piston main chamber 315.

The piston pilot housing 330 is coupled to the piston rod 350 between the piston main valve 320 and the piston valve main body 300. Further, the piston pilot housing 330 has a piston pilot chamber 335 formed to communicate with the piston inlet flow path 354 formed in the piston rod 350. That is, an area of the piston pilot housing 330 is opened, and this opened area is defined as the piston pilot chamber 335.

The piston inlet disk 390 is interposed between the piston pilot housing 330 and the pilot valve 340 to communicate the piston pilot chamber 335 with the piston inlet flow path 354.

Figure 7:
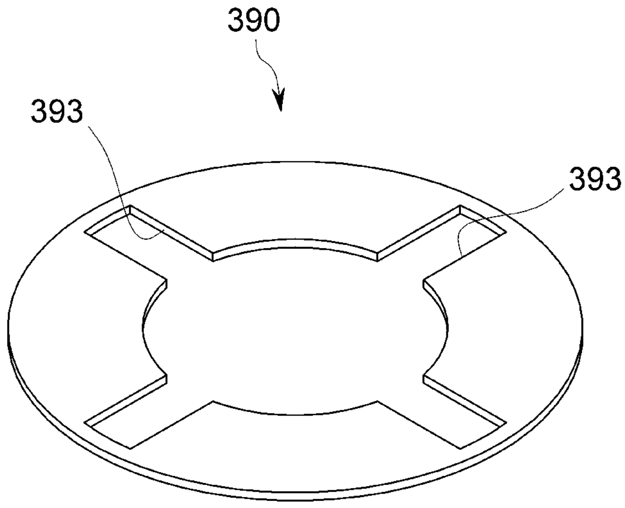
FIG. 7 is a perspective view illustrating a piston inlet disk used in the piston valve assembly of FIG. 6.

Specifically, as illustrated in FIG. 7, the piston inlet disk 390 includes at least one piston inlet disk slit 393 formed to communicate the piston inlet flow path 354 formed in the piston rod 350 with the piston pilot chamber 335 to allow working fluid to enter the piston pilot chamber 335. The piston inlet disk slit 393 is formed from a hollow portion of the piston inlet disk 390 that the piston rod 350 penetrates to a position that communicates with the piston pilot chamber 335. Accordingly, the piston inlet flow path 354 and the piston pilot chamber 335 are communicated through the piston inlet disk slit 393. Further, the flow rate of working fluid entering the piston pilot chamber 335 is adjusted by adjusting the number and size of the piston inlet disk slits 393.

As described above, because the piston pilot chamber 335 is communicated with the piston inlet flow path 354 via the piston inlet disk 390, an inflow flow rate of working fluid entering the piston pilot chamber 335 during the extension process is relatively more limited than an inflow flow rate of working fluid entering the piston main chamber 315, depending on frequency.

For example, as pressure of working fluid entering the piston inlet flow path 354 increases, working fluid entering the piston pilot chamber 335 will have a lower flow rate than working fluid entering the piston main chamber 315.

The pilot valve 340 is coupled to the piston rod 350 to cover the piston pilot chamber 335, and presses the piston main valve 320 to close the piston main chamber 315 when pressure in the piston pilot chamber 335 increases above a predetermined pressure. Here, the predetermined pressure is configured to vary depending on the performance required for the frequency sensitive shock absorber 102, and pressure that balances pressure in the piston main chamber 315 with pressure in the piston pilot chamber 335. Further, the predetermined pressure is adjusted by the size of at least one piston inlet disk slit 393 formed in the piston inlet disk 390.

Specifically, pilot valve 340 is configured to press the piston main valve 320 by pressure of working fluid introduced into the piston pilot chamber 335 during the low frequency extension process, thereby allowing the piston main valve 320 to close the piston main chamber 315. Further, during the high frequency extension process, as pressure of working fluid entering the piston pilot chamber 335 becomes relatively lower than pressure of working fluid entering the piston main chamber 315, a force for the pilot valve 340 to press the piston main valve 320 decreases, and the piston main valve 320 is opened by pressure in the piston main chamber 335.

Here, during the high-frequency extension process, the pressure of working fluid entering the piston pilot chamber 335 is relatively lower than the pressure of working fluid entering the piston main chamber 315 because an inflow flow rate of working fluid entering the piston pilot chamber 335 is limited as the working fluid enters through the piston inlet disk 390.

For example, during a low frequency extension process, the flow rate of working fluid entering the piston pilot chamber 335 through the piston inlet disk 390 is sufficient to facilitate pressure formation in the piston pilot chamber 335, such that when pressure between the piston pilot chamber 335 and the piston main chamber 315 is equilibrated, the piston main valve 320 is not opened. However, during the high frequency extension process, the flow rate of working fluid entering the piston pilot chamber 335 is limited by the piston inlet disk 390, causing pressure in the piston pilot chamber 335 to be lower than pressure in the piston main chamber 315. Therefore, a force of the pilot valve 340 pressing the piston main valve 320 decreases, causing the piston main valve 320 to be opened by pressure in the piston main chamber 315, thereby allowing working fluid in the rebound chamber 270 to move through the piston inlet flow path 354 and the piston main chamber 315 to the compression chamber 260.

That is, during the low frequency extension process, working fluid in the rebound chamber 270 moves to the compression chamber 260 through the body valve main body 300. In contrast, during the high frequency extension process, working fluid in the rebound chamber 270 moves to the compression chamber 260 through the piston valve main body 300, the piston inlet flow path 354, and the piston main chamber 315. Therefore, the frequency sensitive shock absorber 102 becomes capable of varying a damping force generated in response to a change in frequency.

In at least one area where the pilot valve 340 faces the piston pilot housing 330, an accumulator 345 is formed to maintain and buffer pressure in the piston pilot chamber 335.

The piston washer 380 is mounted on the piston rod 350 such that the piston washer 380 is provided between the piston nut 355, which will be described later, and the other surface of the piston main retainer 310 that is described above.

The piston nut 355 is fastened to an end of the piston rod 350, which has penetrated the piston valve body 300, the piston pilot housing 330, and the piston main retainer 310 in turn. That is, the piston nut 355 prevents the piston valve assembly 301 from separating from the piston rod 350.

With this configuration, the piston valve assembly 301 according to the second embodiment of the present disclosure and the frequency sensitive shock absorber 102 having the same effectively generates a damping force that varies with changes in frequency and speed.

Specifically, by adjusting the inflow flow rate of working fluid that passes through the piston inlet flow path 354 and enters the piston pilot chamber 335 and the piston main chamber 315 during the extension process, a similar damping force is implemented at low and high frequencies in the low speed section, and the damping force is variable according to low and high frequencies in the medium and high speed sections, thereby simultaneously satisfying ride quality and stability of adjustment of the vehicle.

Hereinafter, with reference to FIGS. 8 and 9, an operational state of the piston valve assembly 301 and the frequency sensitive shock absorber 102 having the same will be described in detail according to the second embodiment of the present disclosure.

Figure 8:
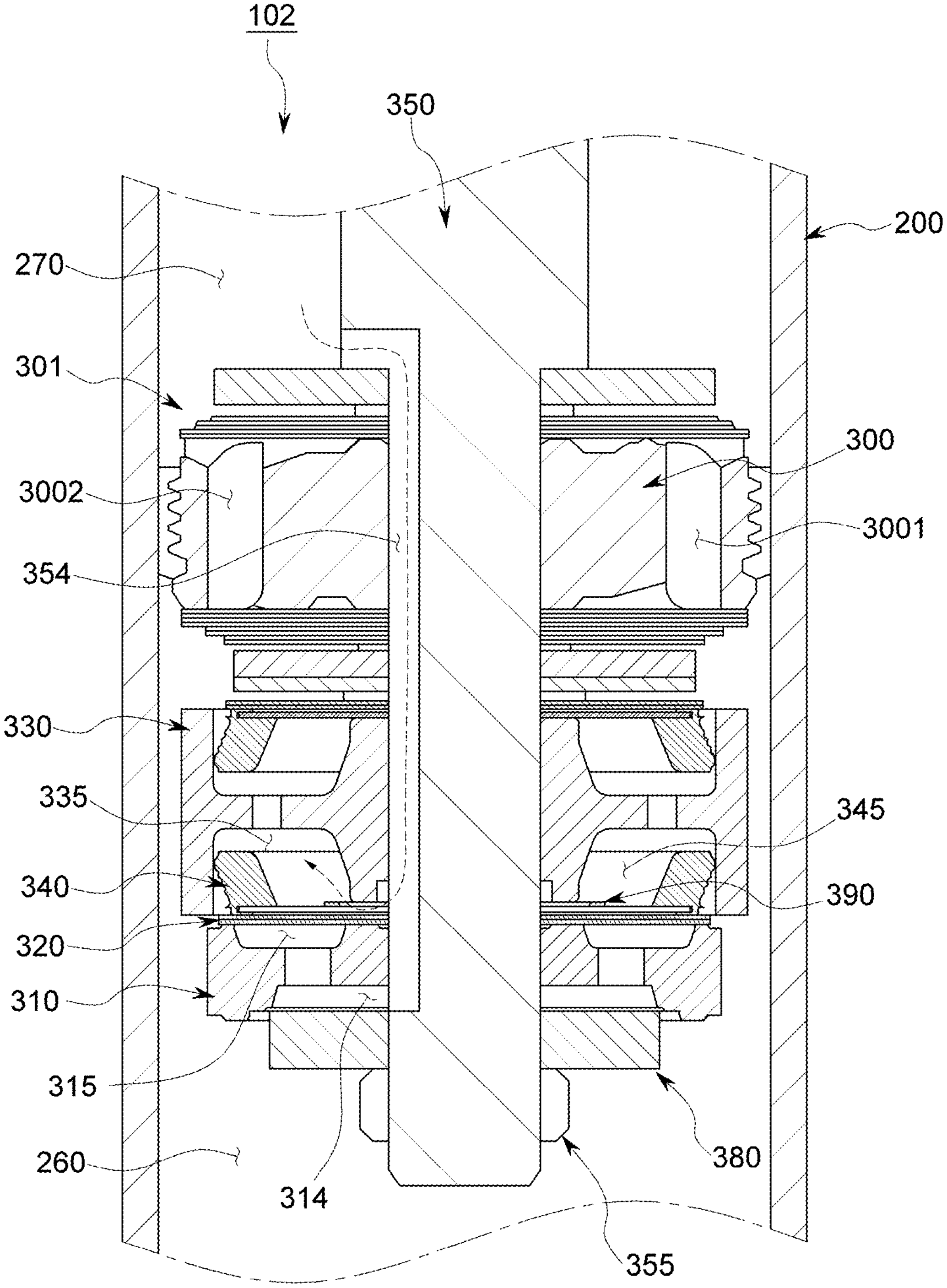
FIGS. 8 and 9 are cross-sectional views illustrating an operational state of the frequency sensitive shock absorber of FIG. 6.

First, as illustrated in FIG. 8, during the low frequency extension process, a stroke of the piston rod 350 is operated in a relatively greater range than during the high frequency extension process. Accordingly, pressure in the piston pilot chamber 335 increases as the inflow flow rate of working fluid entering the piston pilot chamber 335 increases.

As described above, during a low frequency extension process, the flow rate of working fluid entering the piston pilot chamber 335 through the piston inlet disk 390 is sufficient to facilitate pressure formation in the piston pilot chamber 335, such that pressure between the piston pilot chamber 335 and the piston main chamber 315 is equilibrated, and thus the piston main valve 320 is not opened.

That is, when pressure in the piston pilot chamber 335 increases above a predetermined pressure during the low frequency extension process, the pilot valve 340 presses the piston main valve 320 by pressure of working fluid introduced into the piston pilot chamber 335 to close the piston main chamber 315.

Here, the predetermined pressure is configured to vary depending on the performance required for the frequency sensitive shock absorber 102, and pressure that balances pressure in the piston main chamber 315 with pressure in the piston pilot chamber 335. Further, the predetermined pressure is adjusted by the size of at least one piston inlet disk slit 393 formed in the piston inlet disk 390.

Therefore, during the low frequency extension process, working fluid in the rebound chamber 270 moves through the piston valve main body 300 to the compression chamber 260 and is not allowed to move through the piston inlet flow path 354 and the piston main chamber 315. Therefore, the frequency sensitive shock absorber 102 generates a relatively high damping force during the low frequency extension process.

Figure 9:
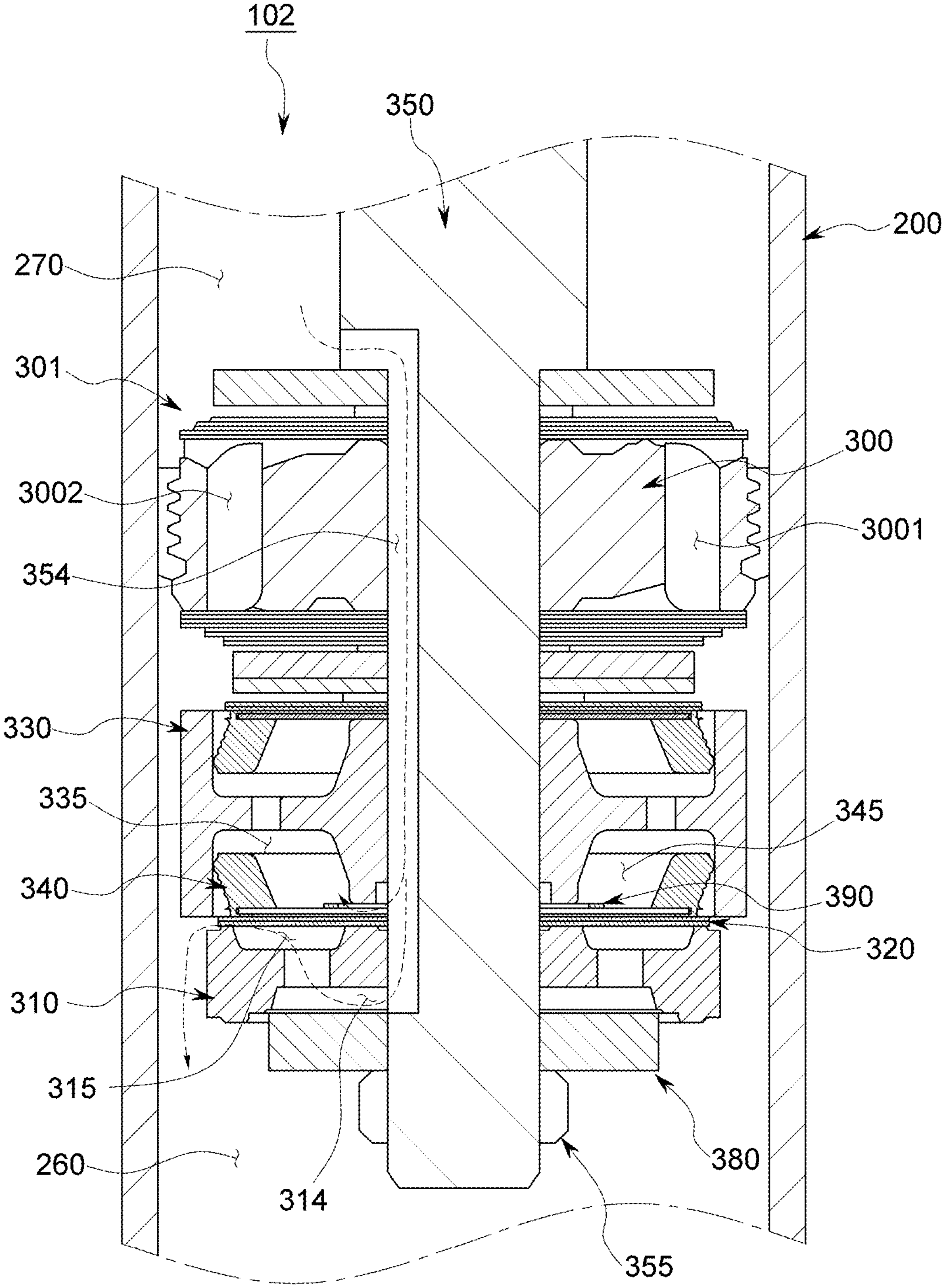

Next, as illustrated in FIG. 9, during the high frequency extension process, a stroke of the piston rod 350 is operated with a relatively smaller range than during the low frequency extension process. Accordingly, pressure in the piston pilot chamber 335 decreases as the inflow flow rate of working fluid entering the piston pilot chamber 335 decreases.

As described above, during the high frequency extension process, the inflow flow rate of working fluid entering the piston pilot chamber 335 is limited by the piston inlet disk 390, causing pressure in the piston pilot chamber 335 to be lower than pressure in the piston main chamber 315. Therefore, a force of the pilot valve 340 pressing the piston main valve 320 decreases, causing the piston main valve 320 to be opened by pressure in the piston main chamber 315, thereby allowing working fluid in the rebound chamber 270 to move through the piston inlet flow path 354 and the piston main chamber 315 to the compression chamber 260 as well.

That is, when pressure in the piston pilot chamber 335 decreases below a predetermined pressure during the high frequency extension process, a force with which the pilot valve 340 presses the piston main valve 320 is weakened by pressure of working fluid introduced into the piston pilot chamber 335. Accordingly, the piston main valve 320 is operated to be opened by pressure in the piston main chamber 315.

Therefore, during the high-frequency extension process, working fluid in the rebound chamber 270 moves to the compression chamber 260 not only through the piston valve main body 300, but also through the piston inlet flow path 354 and the piston main chamber 315. That is, during the high frequency extension process, the piston inlet flow path 354 and the piston main chamber 315 form a bypass flow path through which working fluid moves from the rebound chamber 270 to the compression chamber 260.

Therefore, the frequency sensitive shock absorber 102 generates a relatively low damping force during the high frequency extension process.

Figure 10:
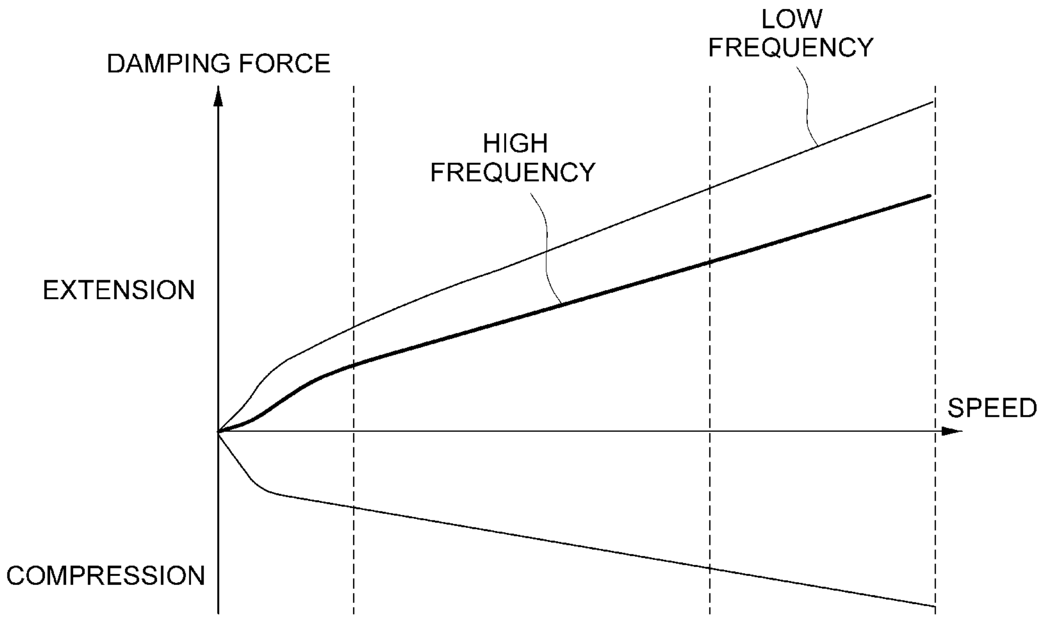
FIG. 10 is a graph illustrating an operational effect of the piston valve assembly and the frequency sensitive shock absorber having the same, according to the second embodiment of the present disclosure.

FIG. 10 is a graph illustrating a damping force variation of the frequency sensitive shock absorber 102 during the low frequency extension process and the high frequency extension process. As illustrated in FIG. 10, the frequency sensitive shock absorber 102 prevents a damping force from decreasing during the low frequency extension process, and that the damping force varies by frequency in the high and medium speed sections.

As described above, the piston valve assembly 301 and the frequency sensitive shock absorber 102 having the same, according to the second embodiment of the present disclosure, prevents degradation of stability of adjustment by preventing a damping force from decreasing in the low speed section during the low frequency extension process, and improves ride quality by generating a variable performance of the damping force by frequency in the medium speed section.

Hereinafter, a third embodiment of the present disclosure will be described with reference to FIG. 11.

The first embodiment and the second embodiment described above both are applied to a frequency sensitive shock absorber according to the third embodiment of the present disclosure. That is, the frequency sensitive shock absorber includes both the body valve assembly 601 and the piston valve assembly 301.

Figure 11:
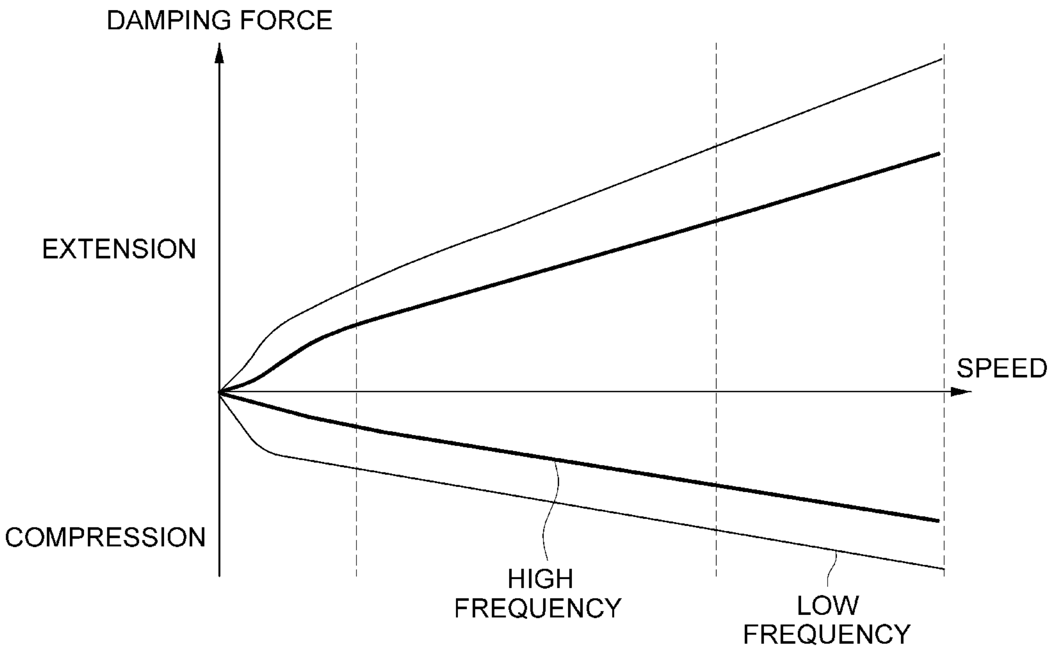
FIG. 11 is a graph illustrating an operational effect of a frequency sensitive shock absorber according to at least third embodiment of the present disclosure.

Accordingly, as illustrated in FIG. 11, the frequency sensitive shock absorber implements a similar damping force at low and high frequencies in the low speed section during both of the compression process and the extension process, and vary the damping force according to low and high frequencies in the medium and high speed sections, thereby simultaneously satisfying ride quality and stability of adjustment of the vehicle.

While the embodiments of the present disclosure have been described with reference to the accompanying drawings, those skilled in the art will understand that the present disclosure may be carried out in any other specific form without changing the technical spirit or an essential feature thereof.

Accordingly, it should be understood that the aforementioned embodiments are described for illustration in all aspects and are not limited, and the scope of the present disclosure shall be represented by the claims to be described below, and it should be construed that all of the changes or modified forms induced from the meaning and the scope of the claims, and an equivalent concept thereto are included in the scope of the present disclosure.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A piston valve assembly configured to generate a damping force of a frequency sensitive shock absorber, the piston valve assembly comprising:

a piston valve main body configured to adjust movement of working fluid between a compression chamber and a rebound chamber, and mounted on a piston rod that is configured to divide a cylinder of the frequency sensitive shock absorber into a compression chamber and a rebound chamber and has a piston inlet flow path formed therein in communication with the rebound chamber;

a piston main retainer coupled to the piston rod and having a piston main chamber formed therein in communication with the piston inlet flow path;

a piston main valve coupled to the piston rod to open and close the piston main chamber;

a piston pilot housing coupled to the piston rod between the piston main valve and the piston valve main body and having a piston pilot chamber formed therein in communication with the piston inlet flow path; and a pilot valve coupled to the piston rod to cover the piston pilot chamber and configured to press the piston main valve to close the piston main chamber when pressure in the piston pilot chamber increases above a predetermined pressure, wherein the piston main chamber is formed by opening an area of one surface of the piston main retainer facing the piston pilot housing, wherein an inlet hole connected to the piston inlet flow path is formed on an other surface of the piston main retainer that is opposite to the one surface of the piston main retainer, and wherein the inlet hole formed on the other surface of the piston main retainer is connected to the piston main chamber formed on the one surface of the piston main retainer.

2. The piston valve assembly of claim 1, further comprising a piston inlet disk interposed between the piston pilot housing and the pilot valve, wherein the piston pilot chamber is communicated with the piston inlet flow path via the piston inlet disk so that an inflow flow rate of working fluid introduced into the piston pilot chamber during an extension process of the frequency sensitive shock absorber is limited compared to an inflow flow rate of working fluid introduced into the piston main chamber, selectively depending on a frequency during the extension process of the frequency sensitive shock absorber.

3. The piston valve assembly of claim 2, wherein the piston inlet disk comprises at least one slit formed to communicate the piston inlet flow path formed in the piston rod with the piston pilot chamber to allow working fluid to be introduced into the piston pilot chamber.

4. The piston valve assembly of claim 2, wherein the pilot valve is configured to press the piston main valve by pressure of working fluid introduced into the piston pilot chamber and allow the piston main valve to close the piston main chamber during a low frequency extension process, and wherein the pilot valve is configured to allow the piston main valve to be opened by pressure in the piston main chamber when a force to press the piston main valve is weakened as the pressure of working fluid introduced into the piston pilot chamber becomes relatively lower than pressure of working fluid introduced into the piston main chamber during a high frequency extension process.

5. The piston valve assembly of claim 1, wherein when an inflow flow rate of working fluid introduced into the piston pilot chamber increases and pressure of the piston pilot chamber increases as a stroke of the piston rod is operated in a greater range during a low frequency extension process than during a high frequency extension process, and wherein the pilot valve is configured to press the piston main valve to close the piston main chamber when pressure in the piston pilot chamber increases above a predetermined pressure.

6. The piston valve assembly of claim 1, wherein when an inflow flow rate of working fluid introduced into the piston pilot chamber decreases and pressure of the piston pilot chamber decreases as a stroke of the piston rod is operated with a smaller range during a high frequency extension process than during a low frequency extension process, and pressure in the piston pilot chamber decreases below a predetermined pressure, and wherein the piston main valve is configured to open by pressure in the piston main chamber.

7. The piston valve assembly of claim 1, wherein the piston inlet flow path is formed in the form of a slit on an outer peripheral surface of one side of the piston rod along a longitudinal direction of the piston rod.

8. The piston valve assembly of claim 1, wherein the piston valve main body comprises a plurality of piston compression flow paths and a plurality of piston extension flow paths that are penetratively formed therein in a direction connecting the compression chamber and the rebound chamber.

9. The piston valve assembly of claim 1, further comprising:

a piston nut fastened to an end of the piston rod that penetrates the piston valve main body, the piston pilot housing, and the piston main retainer in turn; and a piston washer provided between the piston nut and the other surface of the piston main retainer.

10. A frequency sensitive shock absorber comprising:

a piston rod configured to reciprocatingly move inside a cylinder and having a piston inlet flow path formed therein in communication with a rebound chamber; and a piston valve assembly mounted on the piston rod and configured to divide the cylinder into a compression chamber and the rebound chamber and to generate a damping force that varies with magnitude of frequency during an extension process, wherein the piston valve assembly comprises:

a piston valve main body mounted on the piston rod to adjust movement of working fluid between the compression chamber and the rebound chamber;

a piston main retainer coupled to the piston rod and having a piston main chamber formed therein in communication with the piston inlet flow path;

a piston main valve coupled to the piston rod to open and close the piston main chamber;

a piston pilot housing coupled to the piston rod between the piston main valve and the piston valve main body and having a piston pilot chamber formed therein in communication with the piston inlet flow path; and a pilot valve coupled to the piston rod to cover the piston pilot chamber and configured to press the piston main valve to close the piston main chamber when pressure in the piston pilot chamber increases above a predetermined pressure, wherein the piston main chamber is formed by opening an area of one surface of the piston main retainer facing the piston pilot housing, wherein an inlet hole connected to the piston inlet flow path is formed on an other surface of the piston main retainer that is opposite to the one surface of the piston main retainer, and wherein the inlet hole formed on the other surface of the piston main retainer is connected to the piston main chamber formed on the one surface of the piston main retainer.

11. The frequency sensitive shock absorber of claim 10, further comprising a piston inlet disk interposed between the piston pilot housing and the pilot valve, wherein the piston pilot chamber is communicated with the piston inlet flow path via the piston inlet disk so that an inflow flow rate of working fluid introduced into the piston pilot chamber during the extension process is limited compared to an inflow flow rate of working fluid introduced into the piston main chamber, selectively depending on the frequency.

12. The frequency sensitive shock absorber of claim 11, wherein the piston inlet disk comprises at least one slit formed to communicate the piston inlet flow path formed in the piston rod with the piston pilot chamber to allow working fluid to be introduced into the piston pilot chamber.

13. The frequency sensitive shock absorber of claim 11, wherein the pilot valve is configured to press the piston main valve by pressure of working fluid introduced into the piston pilot chamber and allow the piston main valve to close the piston main chamber during a low frequency extension process, and wherein the pilot valve is configured to allow the piston main valve to be opened by pressure in the piston main chamber when a force to press the piston main valve is weakened as pressure of working fluid introduced into the piston pilot chamber becomes relatively lower than pressure of working fluid introduced into the piston main chamber during a high frequency extension process.

14. The frequency sensitive shock absorber of claim 10, wherein when an inflow flow rate of working fluid introduced into the piston pilot chamber increases and pressure of the piston pilot chamber increases as a stroke of the piston rod is operated in a greater range during a low frequency extension process than during a high frequency extension process, and wherein the pilot valve is configured to press the piston main valve to close the piston main chamber when pressure in the piston pilot chamber increases above a predetermined pressure.

15. The frequency sensitive shock absorber of claim 10, wherein when an inflow flow rate of working fluid introduced into the piston pilot chamber decreases and pressure of the piston pilot chamber decreases as a stroke of the piston rod is operated with a smaller range during a high frequency extension process than during a low frequency extension process, and pressure in the piston pilot chamber decreases below a predetermined pressure, and wherein the piston main valve is configured to open by pressure in the piston main chamber.

16. The frequency sensitive shock absorber of claim 10, wherein the piston inlet flow path is formed in the form of a slit on an outer peripheral surface of one side of the piston rod along a longitudinal direction of the piston rod.

17. The frequency sensitive shock absorber of claim 10, wherein the piston valve main body comprises a plurality of piston compression flow paths and a plurality of piston extension flow paths that are penetratively formed therein in a direction connecting the compression chamber and the rebound chamber.

18. The frequency sensitive shock absorber of claim 10, wherein the piston valve assembly further comprises:

a piston nut fastened to an end of the piston rod that penetrates the piston valve main body, the piston pilot housing, and the piston main retainer in turn; and a piston washer provided between the piston nut and the other surface of the piston main retainer.

* * * * *